June 17, 1958

L. C. VAN ATTA 2,839,735

UNDERWATER SOUND REFLECTOR

Filed June 8, 1955

INVENTOR,
LESTER C. VAN ATTA

BY Henry Heyman
ATTORNEY

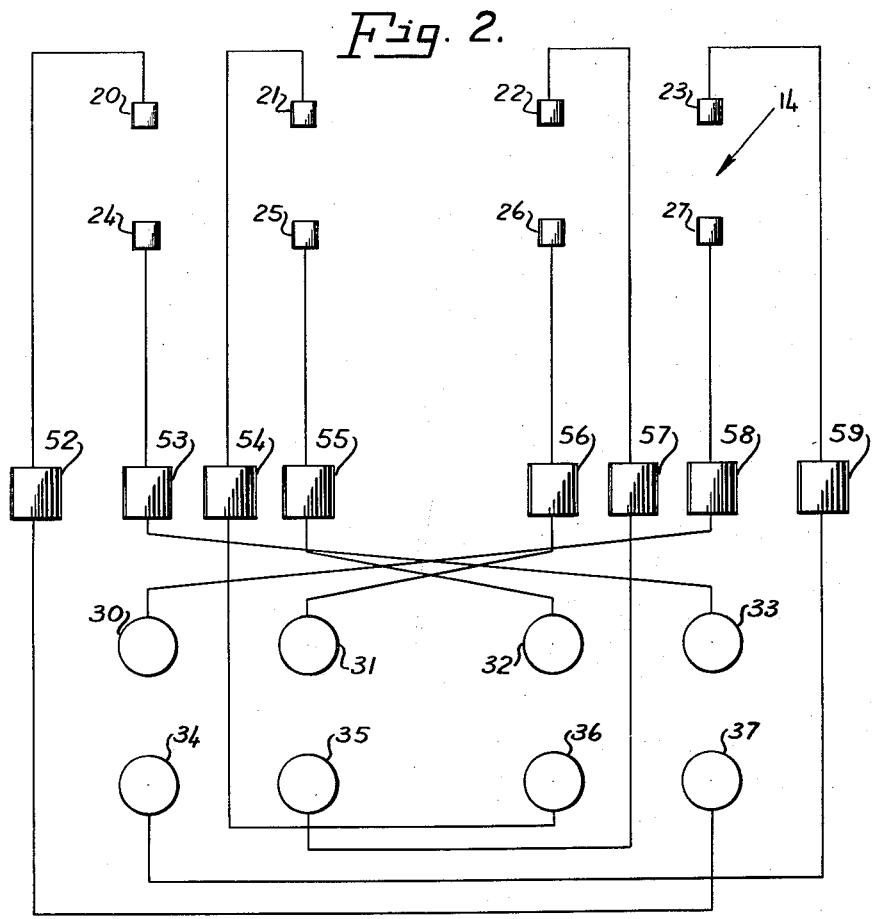
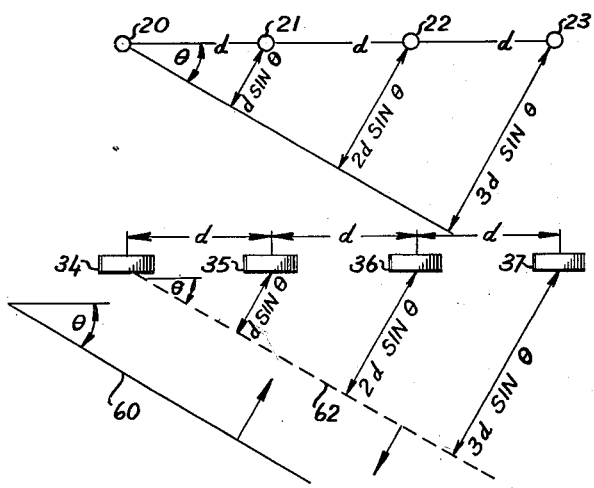
Fig. 2.
Fig. 4.
INVENTOR,
LESTER C. VAN ATTA

United States Patent Office 2,839,735
Patented June 17, 1958

2,839,735

UNDERWATER SOUND REFLECTOR

Lester Clare Van Atta, Pacific Palisades, Calif., assignor to Hughes Aircraft Company, Culver City, Calif., a corporation of Delaware Application June 8, 1955, Serial No. 514,039

4 Claims. (Cl. 340—3)

This invention relates to sound reflectors and more particularly to an apparatus for receiving an underwater sound wave and for transmitting the wave back in the direction from whence it came.

In accordance with the invention, there is provided an array of hydrophones for receiving the underwater sound wave together with a similar array of sound transducers for transmitting the received wave. Each hydrophone in the receiving array is provided with an associated sound transducer in the transmitting array. Further, an associated hydrophone and sound transducer are symmetrically disposed with respect to each other relative to a geometrical center in each respective array. A connection is made from each hydrophone through an amplifier to its associated sound transducer. Each amplifier is adjusted to provide the same gain and phase shift so as to not distort the wavefront of the transmitted sound wave. The receiving array is disposed in a plane that is parallel to the plane of the transmitting array and a sufficient distance behind it to avoid regenerative feedback.

In the operation of the device, the hydrophones of the receiving array receive portions of a sound wave in a sequence determined by the angle at which the wave is incident on the array. The signal received by each hydrophone is then amplified by an equal amount and impressed on its associated symmetrically disposed sound transducer in the transmitting array. In that the velocity of sound is negligible compared to that of the electric signal present between each hydrophone and its transducer, the delay represented by the interval from the instant a signal is received to the instant it is transmitted may be neglected. Thus the signals received by the hydrophones are transmitted by the associated sound transducers in the same sequence in which they were received. Since the sound transducers are symmetrically disposed with respect to their associated hydrophone, the individual transmitted waves reinforce to form a composite wavefront having a direction directly opposite from that of the incident wave. The device of the present invention is particularly adapted for simulating a target of any desired size in conjunction with underwater sound detection apparatus such as, for example, that described in U. S. Patent 1,667,540, issued April 24, 1928, to H. G. Dorsey.

It is therefore an object of the invention to provide apparatus for efficiently directing a sound wave incident thereon back in the direction from whence it came.

Another object of the invention is to provide a first array for receiving an underwater sound wave and a second array for transmitting the wave back in the direction from whence it came.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only, and is not intended as a definition of the limits of the invention.

Fig. 2 is a schematic diagram illustrating the interconnections between the array of hydrophones and the array of sound transducers;

Fig. 4 is a diagram showing the geometrical arrangement between an incident and a transmitted sound wave with a linear element of the receiving and transmitting arrays, respectively.

Figure 1:
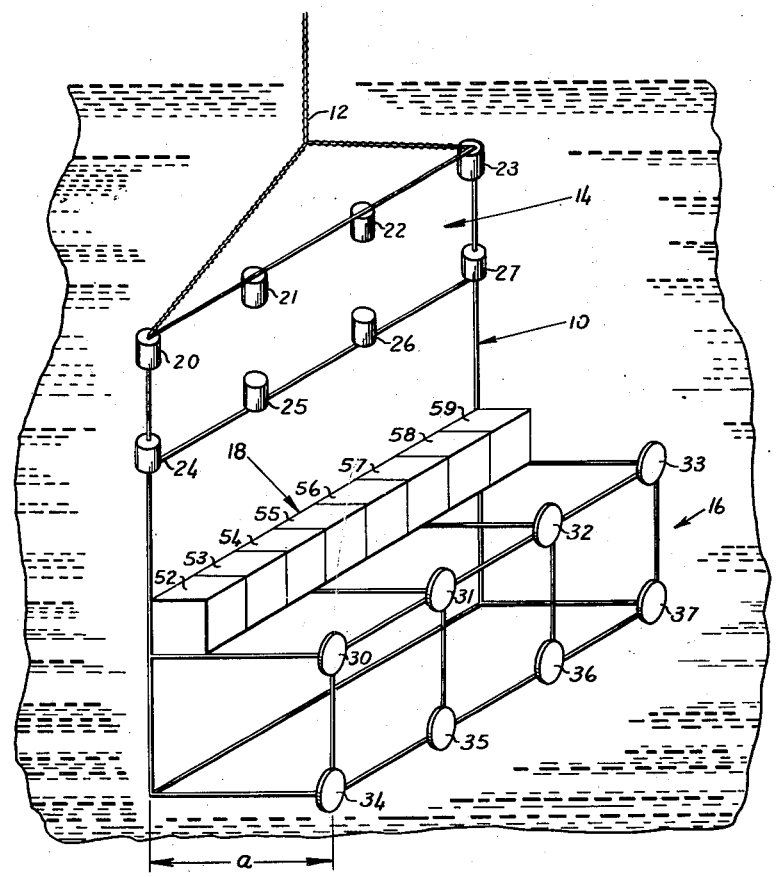
Fig. 1 is a perspective view of a device of the present invention.

Referring now to the drawings, there is illustrated in Fig. 1 a schematic diagram of one embodiment of the device of the present invention in perspective. The device comprises a frame 10 provided with a cable 12 to enable it to be suspended in a liquid. In addition, the frame 10 has provision for mounting a receiving array 14, a transmitting array 16, and a housing 18 for enclosing an amplifier for each associated pair of elements in the arrays 14 and 16.

More particularly, receiving array 14 comprises a two-dimensional array of eight hydrophones 20–27 which are divided into upper and lower horizontal linear elements including hydrophones 20, 21, 22, 23 and 24, 25, 26, 27, respectively. The hydrophones 20–27 are mounted on the frame 10 at points equidistant from each other in both horizontal and vertical directions.

The transmitting array 16, on the other hand, comprises a two-dimensional array of eight sound transducers 30–37 which are mounted on the frame 10 in an array that is congruent with the receiving array 14. Also, the array 16 is mounted in a plane that is a distance $a$ in front of the receiving array 14 which is sufficient to avoid regenerative feedback from the sound transducers 30–37 to the hydrophones 20–27. As in the case of the hydrophones 20–27, the sound transducers are divided into upper and lower horizontal linear elements including sound transducers 30, 31, 32, 33 and 34, 35, 36, 37, respectively. In that the array 16 is congruent to the array 14, the distances between centers of the transducers 30–37 is the same as the corresponding distances between the hydrophones 20–27 of the array 14.

Figure 3:
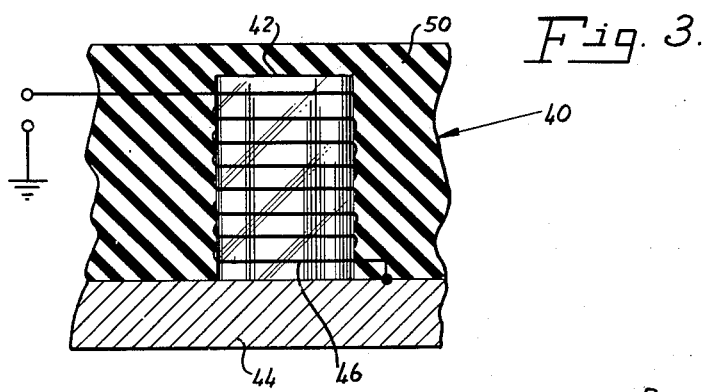
Fig. 3 is a schematic diagram of a single crystal element in a sound transducer.

The sound transducers may, for example, comprise a plurality of the type of transmitting element 40 shown in Fig. 3. Referring to this figure, transmitting element 40 includes a piezoelectric crystal 42 which has the property of changing its length when subjected to a longitudinal magnetic field. Crystal 42 is mounted against a metal back plate 44 so as to retain one extremity thereof in a fixed position, i. e., the changes in the length of the crystal will occur at the extremity thereof farthest from the back plate 44. A winding 76 disposed about the longitudinal axis of the crystal 42 provides a means of producing a magnetic field therealong that is representative of the signal to be transmitted. The complete crystal 42 with its associated winding 46 is imbedded in a hard rubber jacket 50 which provides impedance matching between the crystal 42 and the liquid in which the entire device is immersed. It is noted that the sound wave imparted to the surrounding fluid by the crystal 42 has a frequency that is double that applied to the winding 46 in that the magnetic field is produced on both alternations of each cycle. This effect can be remedied by employing hydrophones 20–27 that divide the frequency of a received signal by two.

Referring again to Fig. 1, the frame 10 supports the housing 18 for enclosing amplifiers 52–59 which provide gain intermediate the hydrophones 20–27 and the sound transducers 30–37. The connections from the hydrophones 20–27 through the amplifiers 52–59 to the sound transducers 30–37 are not shown in Fig. 1 as the wiring is completely enclosed within tubular elements of frame 10. A schematic diagram of these connections, however, is shown in Fig. 2. Referring to this figure, each hydrophone of the array 14 is connected through an amplifier to an associated sound transducer of the array 16. This sound transducer is symmetrically disposed in the array 16 with respect to a geometrical center relative to the position of its associated hydrophone in the array 14. More particularly, hydrophones 20, 21, 22, 23 are connected through amplifiers 52, 54, 57, 59 to sound transducers 37, 36, 35, 34, respectively. In addition, hydrophones 24, 25, 26, 27 are connected through amplifiers 53, 55, 56, 58 to sound transducers 33, 32, 31, 30, respectively.

The operation of the device may be readily understood by a consideration of the direction of incidence on a single horizontal lineal array of hydrophones 20, 21, 22, 23 and the direction of transmission from the corresponding horizontal lineal array of sound transducers 34, 35, 36, 37. The above angle of incidence and transmission is, of course, for a horizontal plane. Referring to Fig. 4, there is shown a plan view of the horizontal lineal array of hydrophones 20–23 and the horizontal lineal array of sound transducers 34–37. As previously noted, the adjacent hydrophones and adjacent sound transducers are spaced equal distances apart, which distance may be designated by $d$.

A sound wave having a phase front represented by a line 60 is incident on the lineal array of hydrophones at an angle, $\theta$. It is apparent that at the time the phase front of the wave is incident on the hydrophone 20, the distance to hydrophones 21, 22, 23 is $d \sin \theta$, $2d \sin \theta$, and $3d \sin \theta$, respectively. Immediately upon being received by the hydrophones 20, 21, 22, 23, however, the wave is transmitted by the sound transducers 37, 36, 35, 34, respectively. The transmitted sound waves from the individual transducers reinforce to form a composite sound wave having a phase front represented by the dashed line 62. Since the sound transducers 34–37 are spaced the same distance apart as are the hydrophones, the phase front represented by the dashed line 62 will also make an angle $\theta$ with horizontal lineal array of sound transducers 34–37.

It is apparent from the above, that the same result would obviously occur in a vertical plane if vertical lineal arrays were to be considered. Also, there is obviously no restriction as to the actual number of elements employed in each array. Thus from the above, it is evident that the transmitted wave will be directed away from the device in the same direction from whence it came. The gain of the amplifiers 52–59 may be adjusted so as to simulate a target of any desired size.

What is claimed is:

1. A device for directing a sound wave back in the direction from whence it came, said device comprising a first array including no less than two receiving elements capable of converting respective portions of said sound wave incident thereon into electrical signals; a second array of transmitting elements disposed in a plane parallel to the plane of said first array, the number of transmitting elements in said second array being equal to the number of receiving elements in said first array; and means for coupling each one of said transmitting elements to an associated receiving element in said first array for converting said electrical signals into corresponding sound waves, the position of said one transmitting element relative to the geometrical center of said second array being symmetrical with respect to the position of its associated receiving element relative to the geometrical center of said first array, whereby said corresponding sound waves reinforce to form a composite sound wave having a direction away from said device that is opposite from the direction of the wave incident thereon.

2. The device as defined in claim 1 wherein the plane of said first array of receiving elements is behind the plane of said second array of transmitting elements with respect to said incident sound wave, whereby said composite wave is directed away from said first array thereby preventing regenerative feedback from said transmitting elements to said receiving elements.

3. An underwater sound device comprising a first lineal array including a plurality of receiving elements, each capable of converting respective portions of a sound wave incident thereon into electrical signals; means for amplifying said electrical signals; and a second similar lineal array disposed parallel to said first array, said second array having a number of transmitting elements equal to the number of receiving elements in said first array, each of said transmitting elements being responsive to the amplified electrical signal from the symmetrically disposed receiving element of said first array relative to the geometrical centers of said arrays.

4. An underwater sound device for directing a sound wave back in the direction from whence it came, said device comprising a first two-dimensional array of hydrophones spaced a predetermined distance between the centers thereof; a second similar array of sound transducers disposed in a plane parallel to said first plane, the distance between centers of adjacent sound transducers being equal to said predetermined distance; and means for connecting each one of said hydrophones through an amplifier to an associated sound transducer, the position of said one hydrophone relative to the geometrical center of said first array being symmetrical with respect to the position of its associated sound transducer relative to the geometrical center of said second array.

No references cited.